United States Patent
Tanaka et al.

[15] 3,665,057
[45] May 23, 1972

[54] METHOD OF PREPARING HIGH IMPACT RESISTANCE RESINS BY A BULK-SUSPENSION TWO STAGE PROCESS

[72] Inventors: Atsushi Tanaka, Tokyo; Hiroomi Kobayashi, Saitama; Teizo Kudo, Saitama; Masatoshi Mikumo, Saitama, all of Japan

[73] Assignee: Daicel Ltd., Osaka, Japan

[22] Filed: Feb. 5, 1970

[21] Appl. No.: 9,067

[30] Foreign Application Priority Data

Feb. 8, 1969 Japan......................................44/9580

[52] U.S. Cl. ................260/876 R, 260/29.6 RB, 260/878 R, 260/880 R
[51] Int. Cl. ..........................................................C08f 41/12
[58] Field of Search......................................260/876, 880 R

[56] References Cited

UNITED STATES PATENTS 3,488,743   1/1970   Baer et al...............................260/879
3,488,744   1/1970   Nemphus et al.......................260/880

*Primary Examiner*—Samuel H. Blech
*Assistant Examiner*—J. Seibert
*Attorney*—Woodhams, Blanchard and Flynn

[57] ABSTRACT

A thermoplastic resin having a high impact resistance is made by subjecting a mixture or a solution of a first quantity of an elastomeric polymer in a monovinyl aromatic hydrocarbon monomer or a mixture of a monovinyl aromatic hydrocarbon monomer and a copolymerizable monovinyl monomer to a bulk-suspension two stage polymerization process. A second quantity of an elastomer consisting of an aqueous latex of butadiene rubber is added to the mixture or solution during the preliminary bulk polymerization step when the conversion of the monomer or monomer mixture to the polymer is about from 10 to 50 percent by weight.

9 Claims, No Drawings

METHOD OF PREPARING HIGH IMPACT RESISTANCE RESINS BY A BULK-SUSPENSION TWO STAGE PROCESS

BACKGROUND OF THE INVENTION

1. Field of the Invention

This invention relates to a method for preparing high impact polystyrene resins, based on graft interpolymer of styrene and elastomers. More specifically, it concerns an improved method for the preparation of rubber-modified polystyrene resins by a bulk-suspension two stage polymerization process.

Although the invention will be described in detail thereafter primarily in terms of the preparation of rubber-modified high impact polystyrene, it is to be understood that the invention also covers other graft interpolymers, especially ABS resins, for example, those wherein styrene is replaced in whole or in part by other monovinyl aromatic monomeric compound such as nuclear substituted styrene and in part by a copolymerizable monomer such as acrylonitrile, α-methyl styrene and methyl methacrylate.

2. Description of the Prior Art

It is well known that commercially available methods for the preparation of so called "high impact polystyrenes" and of so called "ABS resins" can be classified into the following two fundamental types; (1) A method in which styrene or a mixture of styrene and a copolymerizable vinyl monomer, such as acrylonitrile, is added to and emulsified in an aqueous latex of a polybutadiene elastomer and is graft copolymerized in emulsion state onto the polybutadiene molecule, and (2) A method in which an elastomer is dissolved in styrene or a mixture of styrene and a copolymerizable vinyl monomer, such as acrylonitrile, and the resulting solution is subjected to graft copolymerization in a bulk, solution, suspension of bulk-suspension two stage polymerization process.

The present invention pertains to an improvement in the bulk-suspension two stage process among the above processes. The bulk-suspension two stage polymerization process is well established in that an elastomeric polymer is dissolved in styrene monomer or a mixture of styrene and a copolymerizable monomer and the solution formed is subjected to an initial bulk polymerization step until the conversion of monomer to polymer reaches about 10 to 50 percent by weight and, then, the polymerization system is dispersed in an aqueous media and subjected to a suspension polymerization step until polymerization completes. Such bulk-suspension two stage polymerization process have been already described in the U.S. Pat. Nos. 2,886,553 and 3,465,066, hereby incorporated by reference.

The two stage polymerization process has a number of advantages, for example, the polymerization temperature can be controlled relatively easily, the resulting polymer can be easily separated in a small granular form from a polymerization mixture after completion of the polymerization and can be easily washed, dried and recovered and, consequently, it is possible to produce with a good efficiency a polymer having a reduced tendency to discoloration upon heating. However, the process has a disadvantage, namely, that it is difficult to produce a resin having a high rubber content and, consequently, a high impact strength, because of the limited solubility of the elastomeric polymer in the monomer or monomer mixture.

SUMMARY OF THE INVENTION

We have eagerly pursued a method of preparing resins having a very high impact resistance which method, nevertheless, will retain the advantages of the two stage polymerization process as mentioned above, and have made the present invention.

Accordingly, an object of the invention is to provide a novel method for preparing resins having an increased high rubber content and, consequently, an improved high impact strength retaining the advantages of the two stage polymerization process as mentioned above.

Generally, the present invention provides a novel method of preparing resins having a high impact resistance by dissolving or mixing an elastomeric polymer in a monovinyl aromatic hydrocarbon monomer or a mixture of a monovinyl aromatic hydrocarbon monomer and a copolymerizable monovinyl monomer, then subjecting the solution or mixture thus formed to a preliminary bulk polymerization step until the conversion of the monomer or monomer mixture to the polymer reaches about 10 to 50 percent by weight and then subjecting the solution or mixture to a suspension polymerization step by dispersing the system in an aqueous medium until the polymerization is completed. An essential feature of this invention is that, in addition to the elastomeric polymer (elastomer A) present in the solution or mixture prior to the preliminary bulk polymerization step, an aqueous latex of a butadiene rubber (elastomer B) and a coagulant for the latex are added to and uniformly mixed with the preliminary polymerization system after the phase inversion occurs in the preliminary bulk polymerization system and the resulting mixture is then subjected to the suspension polymerization step.

In the known emulsion polymerization method, as mentioned above, in which styrene or mixture of styrene and a copolymerizable monovinyl monomer is added to and polymerized in an aqueous latex of a butadiene rubber, the polymerizate is obtained in the form of an aqueous latex and the polymer is isolated and recovered through troublesome coagulation, washing and drying procedures. On the other hand, in the method of the present invention, the polymerizate is obtained finally in the form of small granules which can be easily handled so that it can be isolated and recovered without difficulty.

As the monovinyl aromatic hydrocarbon monomer to be used in the method of the present invention the most suitable is styrene, although nuclear substituted styrenes such as vinyl toluene and p-chlorostyrene and mixtures of styrene with such substituted styrenes may also be used. The copolymerizable monovinyl monomer which can be optionally used in mixture with styrene is exemplified by acrylonitrile, α-methyl styrene, acrylate esters and methacrylate esters, such as methyl, ethyl and butyl esters, but it is not restricted thereto and may be any one or more of polymerizable compounds containing an ethylenic $>C = C<$ group.

The elastomer (A) to be mixed in the styrene monomer or monomer mixture prior to the preliminary bulk polymerization step, in the method of the present invention, is one of such elastomers as generally having been used in the manufacture of impact rubber-modified resins, preferably synthetic rubbers derived from butadiene, isoprene, chloroprene or the like as a predominant constituent. Especially, such rubbers as polybutadiene and butadiene-styrene copolymers of a relatively high stereoregularity prepared in solution polymerization by using a catalyst based on an organometallic compound can give a good result. In addition thereto, elastomeric ethylene-vinyl acetate copolymers and other elastomers which is soluble in styrene may also be used.

As the elastomer (B) to be added later in the form of an aqueous latex to the polymerization system is one of such elastomers as polybutadiene or butadiene-styrene copolymers prepared in emulsion polymerization. Such latices, in which the average particle size of the elastomer particles is 0.1 to 1.0 micron, give advantageous results.

The elastomer (A) may be used in an amount of from about 10 to 25 percent by weight of the total weight of the monomer or monomer mixture, preferably 10 to 20 percent by weight. The elastomer (B) may be used in an amount of 5 to 30, preferably 10 to 30 percent by weight of monomer or monomer mixture. The total amount of the elastomers (A) and (B) may be from about 25 to 55 percent by weight of monomer or monomer mixture.

It is appropriate to add the elastomer (B) in the form of a latex to the polymerization system when the conversion of monomer to a polymer has reached about 10 to 50 percent by weight. That is to say, in the initial bulk polymerization step of the two stage polymerization process, polymerization of styrene proceeds containing dissolved therein an elastomer (A) and then there occurs a phase inversion such that the elastomer in the continuous phase is converted to a dispersed phase by the formation of a styrene polymer which becomes the continuous phase. It is essential that an elastomer latex (B) is added after the phase inversion has been obtained. Usually, the phase inversion will be obtained when the conversion of the monomer or monomer mixture to the polymer reaches about from 10 to 50 percent by weight of the monomer or monomer mixture.

If an elastomer (B) in the form of a latex is added to the system before this phase inversion occurs, rubber particles in the latex will be swollen by and dissolved in the unreacted monomer and, as a result, the viscosity of the system will increase to such a high extent as to remarkably lower the efficiency of agitation of the system. Therefore, the low efficiency of agitation will result in coarse and non-uniform dispersion of the elastomer in the resinous phase and, accordingly, the thermoplastic resinous product will have an insufficient quality with respect to, e.g., surface luster. On the other hand, although the aqueous latex of an elastomer (B) can be added to the system when the system is in the aqueous suspension polymerization stage, after completion of the initial bulk polymerization stage, this procedure is undesirable because of the very great difficulty of uniformly incorporating or mixing the rubber particles in the latex into the polymer particles already formed and dispersed in the aqueous medium and because of the remarkably lowered suspension stability of the system by the action of the surface active agent contained in the latex. Actually, in the latter case, only a polymerizate of a low quality which will have a low impact strength and a discoloration tendency will be obtained. Therefore, the present invention is based on the discovery that it is essential to introduce a rubber latex to the polymerization system in the latter half or final period of the initial bulk polymerization stage (when the conversion reached 10 to 50 percent by wt.) and, after subsequently agitating and homogeneously mixing therein a proper amount of a coagulant for latex, subjecting the system to suspension polymerization. The above term "proper amount," with respect to the coagulant, means an amount near the minimum amount necessary for breaking the emulsion state of the rubber latex. In the usual case, this effect is obtainable by adding about 0.5 to 2 percent by weight, based on the weight of the latex, of a coagulant in the form of an aqueous solution. The coagulant for latex to be used in the present invention may be exemplified by hydrochloric acid, sulfuric acid, acetic acid, sodium chloride, sodium sulfate, magnesium sulfate and other inorganic acids, organic acids and inorganic electrolytes, although hydrochloric acid can conveniently be used in most cases. In the polymerization process of the present invention, there may be used any of the organic peroxides, azo compounds and other conventional radical polymerization catalysts. The polymerization temperature is not particularly different from the ones conventionally used in prior art processes and may be, in general, in the range of 50° to 150° C, preferably 70° to 120° C, according to the polymerization catalyst used. In the polymerization system, there may be incorporated, a molecular weight regulator such as mercaptans, a plasticizer or an internal lubricant such as butyl stearate and paraffins, an antioxidant such as phosphite esters and other conventional additives. In the second or suspension polymerization stage, there may be used any of the dispersing agent used in the ordinary suspension polymerization processes, without any special limitation.

The present invention will now be illustrated by the following nonlimiting examples.

All the following references to "parts" shall mean parts by weight.

EXAMPLE 1

A solution of the following recipe was charged into a 30 liter reaction kettle equipped with a strong agitation mechanism.

Styrene 69 parts
Acrylonitrile 31 parts
Styrene-butadiene rubber* 15 parts
(styrene content: 25% by weight)
Benzoyl peroxide 0.15 part
Dicumyl peroxide 0.10 part
Tertiary dodecyl mercaptan 0.38 part
Butyl phthalylbutylglycolate 4 parts
Water 20 parts

* "Tufdene 2000A" (Trademark), by Asahi Chemical Industry Co., Ltd., Japan

After substitution of air in the kettle with nitrogen, bulk polymerization was carried out at 73° C for 4 hours with agitation at 700 rpm. To the bulk polymerizate was then added 17 parts (10 parts solid) of an aqueous butadiene rubber latex, "fR-S2004" (Firestone Co. U.S.A.). The mixture was stirred for 10 minutes to effect uniform dispersion of the latex and then there was added 1.7 parts of a 1 N aqueous hydrochloric acid to coagulate the latex. The reaction was continued at 73° C for an additional 50 minutes, under agitation. The conversion of the monomer mixture at the moment when the latex was added was 26.8 percent. The reaction mixture was then transferred into a 40 liter pressure reaction vessel equipped with an anchor-shaped stirrer, there was then added thereto 5 parts of magnesium hydroxide and 0.07 part of polyvinyl alcohol dispersed and suspended in 95 parts of water. After substitution of air in the reaction vessel with nitrogen, the temperature was gradually raised to 120° C with stirring and suspension polymerization was conducted at 120° C for 5 hours with stirring at 110 rpm. After cooling, the polymerization mixture was freed from magnesium hydroxide by the addition of aqueous hydrochloric acid, then the mixture was thoroughly washed with water and filtered and dried to recover a polymer at a yield of 92.3 percent. The polymer was pelletized by means of a small size extruder and molded into test pieces by means of an injection molding machine at a cylinder temperature of 240° C, an injection pressure of 45 to 60 Kg/cm², and at a mold temperature of 60° C. The test pieces had a fairly good surface luster. The mechanical properties measured on the test pieces are summarized in the following Table 1.

EXAMPLE 2

A polymer was obtained by repeating the same procedure as described in Example 1 except that there was used 20 parts of a styrene-butadiene rubber, "Tufdene 2000A," and the mechanical properties of the polymer were measured. The results are summarized in Table 1.

COMPARATIVE EXAMPLE 1

A polymerization mixture of the same recipe as described in Example 1 was polymerized in bulk at 73° C for 4 hours with agitation at 700 rpm and then, without the addition of any aqueous latex, was subjected to suspension polymerization in a similar manner as in Example 1. The mechanical properties of the polymer thus obtained are also summarized in Table 1.

TABLE 1

|  | Example 1 | Example 2 | comparative Example 1 |
|---|---|---|---|
| Tensile strength (Kg/cm²) | 308 | 290 | 439 |
| Elongation (%) | 112 | 133 | 39 |
| Izod Impact strength | 30.9 | 33.6 | 16.3 |

The mechanical properties were measured by the following methods:

Tensile strength and elongation

Measured by means of an Instron-type tensile tester, "Tensilon" manufactured by Toyo Sokki Co., in accordance with JIS K–6871 "Testing method for styrene resin molding material."

Izod impact strength

Measured on a ½ × ½ × 2.5 in. mold notched test piece, in accordance with JIS K–6871 "Testing method for styrene resin molding material."

EXAMPLE 3

Into a 30 liter reaction kettle having a strong agitation mechanism, as described in Example 1, there was charged a solution of the same recipe as in Example 1 and, after substitution of the air in the kettle with nitrogen, the charge was subjected to bulk polymerization at 73° C for 3 hours with agitation at 700 rpm, then there was added 25.5 parts (15 parts solid) of an aqueous butadiene rubber latex, "JSR-0700" (made by Japan Synthetic Rubber Co., Japan, solid content 59 percent by weight) and, after coagulation of the latex, the reaction was continued at 73° C for 1 hour and 50 minutes. The conversion of the monomer mixture at the moment of addition of the latex was 21.2 percent by weight. The reaction mixture was subjected to suspension polymerization under the same conditions as in Example 1 to obtain a polymerizate at a yield of 91.0 percent. The mechanical properties of the polymer were measured as follows: tensile strength 297 Kg/cm$^2$, elongation 136 percent and Izod impact strength 26.2 Kg-cm/cm$^2$, and the surface luster was fairly good.

EXAMPLE 4

Into a 30 liter reaction kettle having a strong agitation mechanism, as in Example 1, there was charged a solution containing 15 parts of a butadiene rubber, NF-35 (Asahi Chemical Industry Co., Ltd.), in place of the styrene-butadiene rubber used in Example 1. The remainder of the recipe was the same as in Example 1. After substitution of the air in the kettle with nitrogen, the solution was subjected to bulk polymerization at 73° C for 4 hours with agitation at 860 rpm. To the polymerization mixture was then added 16.2 parts (10 parts solid) of an aqueous styrene-butadiene rubber latex, "Naugatex 2105" (Sumitomo-Naugatac Co., solid content 62 percent), and, after coagulation of the latex, the reaction was continued at 73° C for 50 minutes. The conversion of the monomer mixture at the moment when the latex was added was 28.1 percent. The reaction mixture was subjected to suspension polymerization under the same conditions as in Example 1 to obtain a polymerizate at a yield of 94.8 percent. The polymer product was fairly good in surface luster and had mechanical properties as follows: tensile strength 305 Kg/cm$^2$, elongation 97 percent and Izod impact strength 20.6 Kg-cm/cm$^2$.

EXAMPLE 5

Into a 30 liter reaction kettle having a strong agitation mechanism as described in Example 1, there was charged a solution of the same recipe as in Example 1 except that there was used 15 parts of a polybutadiene rubber, "Diene NF-35" (Asahi Chemical Industry Co., Ltd.) in place of "Tufdene 2000A" and the solution was, after substitution of air in the kettle with nitrogen, subjected to bulk polymerization at 73°C for 4 hours with agitation at 860 rpm. To the bulk polymerizate was then added 17.0 parts (10 parts solid) of an aqueous butadiene rubber latex, "FR-S2004" (Firestone Co., solid content 59 percent) with continuing agitation. After 20 minutes, 1.7 parts of an aqueous acetic acid was added to the polymerization mixture to coagulate the latex and the reaction was continued at 73° C for 40 minutes. The conversion of the monomer mixture at the moment of the addition of the latex was 26.1 percent. The reaction mixture was subjected to suspension polymerization under the same conditions as in Example 1 to obtain a polymerizate at a yield of 93.0 percent. The polymer product was fairly good in surface luster and had mechanical properties as follows: tensile strength 275 Kg/cm$^2$, elongation 97 percent and Izod impact strength 21.2 Kg-cm/cm$^2$.

EXAMPLE 6

Into the same reaction kettle as in Example 1 there was charged a solution consisting of 35 parts of styrene, 30 parts of acrylonitrile, 35 parts of methyl methacrylate, 15 parts of a styrene-butadiene rubber (Tufdene 2000A, Asahi Chemical Industry Co., Ltd.). 0.15 part of benzoyl peroxide, 0.10 part of dicumyl peroxide, 0.35 part of tert.dodecylmercaptan and 20 parts of water and, after substitution of air in the kettle with nitrogen, the solution was polymerized in bulk at 73° C for 3½ hours with agitation at 700 rpm. To the bulk polymerizate was then added 14.3 parts (10 parts solid) of an aqueous styrene-butadiene rubber latex, "JSR-0561" (Japan Synthetic Rubber Co., Ltd., solid content 70 percent), and, after coagulation of the latex, the reaction was continued at 73° C for 50 minutes. The conversion of the monomer mixture at the moment of the addition of the latex was 26.8 percent. The reaction mixture was suspension polymerized under the same conditions as in Example 1 to obtain a polymer at a yield of 93.4 percent. The polymer product had a good surface luster and the following mechanical properties: tensile strength 309 Kg/cm$^2$, elongation 137 percent and Izod impact strength 20.2 Kg-cm/cm$^2$.

EXAMPLE 7

Into a 30 liter reaction kettle having a strong agitation mechanism as used in Example 1 there was charged a solution of the same recipe as in Example 1 except that there was used 15 parts of an ethylene-vinyl acetate copolymer rubber, "Levapren 450" (Bayer Co., West Germany) and, after substitution of air in the kettle with nitrogen, the solution was bulk polymerized at 73° C for 3 hours with agitation at 700 rpm. To the reaction mixture was then added 17.0 parts (10 parts solid) of an aqueous butadiene rubber latex, "JSR-0700" (Japan Synthetic Rubber Co., Ltd.), with agitation and, after coagulation of the latex, the reaction was continued at 73° C for 40 minutes. The conversion of the monomer mixture at the time of the addition of the latex was 20.6 percent. The suspension polymerization of the reaction mixture was conducted under the same conditions as in Example 1 to obtain a polymer at a yield of 92.4 percent. The polymer product had fairly good surface gloss and was far superior in impact strength to a polymerizate obtained by using 15 percent of Levapren 450 as sole elastomer.

The embodiments of the invention in which an exclusive property or privilege is claimed are defined as follows:

1. Improvement in a method for preparing thermoplastic resins having a high impact strength by dissolving or mixing a first quantity of an elastomer polymer selected from the group consisting of diene rubbers and an ethylene-vinyl acetate copolymer in a monovinyl aromatic hydrocarbon monomer or a mixture of a monovinyl aromatic hydrocarbon monomer and a copolymerizable monovinyl monomer, then subjecting the solution or mixture to an initial bulk polymerization step, then subjecting the solution or mixture to a suspension polymerization step by dispersing the mixture or solution in an aqueous medium until polymerization is completed, the improvement comprising adding to and uniformly mixing in the solution or mixture during the initial bulk polymerization step, after from about 10 to 50 percent by weight of the monomer or monomer mixture has been converted to the polymer and the phase inversion has occurred in the system, a second quantity of an elastomer consisting of an aqueous latex of a butadiene rubber and a coagulant therefor, following which the suspension polymerization step is carried out to obtain a polymer having an improved impact strength.

2. Improved method according to claim 1, in which the first quantity of the elastomeric polymer is from about 10 to 25 percent by weight of the total weight of the monomer or monomer mixture, in which the second quantity of the elastomer, calculated as the solids, is from about 5 to 30 percent by weight of the monomer or monomer mixture, and the combined amounts of the first and second quantities is from about 25 to 55 percent by weight of the monomer or monomer mixture.

3. Improved method according to claim 1, in which the monovinyl aromatic hydrocarbon is selected from the group consisting of styrene and nuclear substituted styrenes.

4. Improved method according to claim 1, in which the copolymerizable vinyl monomer is a monomer selected from the group consisting of acrylonitrile, α-methyl styrene, methyl methacrylate and mixtures thereof.

5. Improved method according to claim 1, in which the elastomer polymer is selected from the group consisting of homopolymers and copolymers derived from butadiene, isoprene and chloroprene and ethylene-vinyl acetate copolymers.

6. Improved method according to claim 1, in which the aqueous latex of a butadiene rubber is selected from the group consisting of polybutadiene and butadiene-styrene copolymer prepared in emulsion polymerization.

7. Improved method according to claim 1, in which the average particle size of the elastomer particles in the latex is from 0.1 to 1.0 microns.

8. Improved method according to claim 1, in which the amount of the coagulant added is sufficient to break the emulsion state of the latex.

9. Improved method according to claim 8, in which the amount of the coagulant added is from about 0.5 to 2 percent by weight, based on the weight of the latex.

* * * * *